United States Patent

Tyler, II et al.

[15] 3,662,339

[45] May 9, 1972

[54] LISTING VERIFICATION SYSTEM

[72] Inventors: Victor M. Tyler, II, Concord; Charles G. Beaudette, Sudbury; Allan B. Chertok, Cambridge, all of Mass.

[73] Assignee: EG&G, Inc., Bedford, Mass.

[22] Filed: July 25, 1969

[21] Appl. No.: 845,021

[52] U.S. Cl. ....................340/146.2, 235/61.7 B, 340/149 A, 340/174.1 C

[51] Int. Cl. ..........................................................G06f 7/06

[58] Field of Search ....................340/146.2, 149 A, 174.1 C; 274/1, 9, 17, 15; 235/61.7

[56] References Cited

UNITED STATES PATENTS

| | | | |
|---|---|---|---|
| 2,952,464 | 9/1960 | Stimler | 274/15 |
| 2,953,383 | 9/1960 | Walters | 274/15 |
| 3,184,714 | 5/1965 | Brown, Jr. et al | 340/149 |
| 3,258,750 | 6/1966 | Shew | 340/174.1 |
| 3,314,057 | 4/1967 | Mogtader | 340/174.1 |
| 3,337,852 | 8/1967 | Lee et al. | 340/174.1 X |
| 3,404,259 | 10/1968 | Atkinson, Jr. et al | 340/149 |
| 3,449,734 | 6/1969 | Frey et al. | 340/174.1 |
| 3,511,509 | 5/1970 | Firestone | 274/9 |
| 3,513,441 | 5/1970 | Schwend | 340/149 |

*Primary Examiner*—Charles E. Atkinson
*Attorney*—Kenway, Jenney & Hildreth and Ralph L. Cadwallader

[57] ABSTRACT

A random access comparator incorporating a phonographic recording system adapted to employ a phonographic disk on which a serial train of signals representing a list of numerical digital data entries such as derogatory credit card numbers is recorded in predetermined groups, with the numbers in each group arranged in natural order, a data entry means such as a keyboard on which a data entry can be registered, means responsive to the registration of a data entry on the keyboard for setting the arm of the phonograph to a position adjacent the vicinity on the record in which a corresponding data entry would be recorded, and apparatus for checking the recorded data in that vicinity to determine whether or not the registered entry is recorded on the record and to produce a corresponding indication.

6 Claims, 9 Drawing Figures

INVENTORS
VICTOR M. TYLER II
CHARLES G. BEAUDETTE
ALLAN B. CHERTOK

BY

ATTORNEYS

PATENTED MAY 9 1972 3,662,339

SHEET 2 OF 5

CP=CURRENT POSITION OF STYLUS
DP=DESIRED POSITION OF STYLUS
CAL=CALIBRATION CYCLE
ARM=STYLUS ARM
ARM MOTOR=ARM UP/DOWN MOTOR CTRL
DRIVE=ARM POS. MOTOR POWER CTRL
DA=DISK DATA ADDRESS
KA=KEYBOARD ADDRESS
DW=DISK DATA WORD (10 DIGIT NUMBER)
KW=KEYBOARD WORD
CONTINUITY=TURNTABLE ACCESS COVER INTERLOCK SWITCH
HOME=ARM CLEAR OF DISK FOR DISK CHANGING (≅−128)
TURNTABLE=TURNTABLE MOTOR POWER
0=FIRST GROOVE
+128=CENTER GROOVE
+225=LAST GROOVE

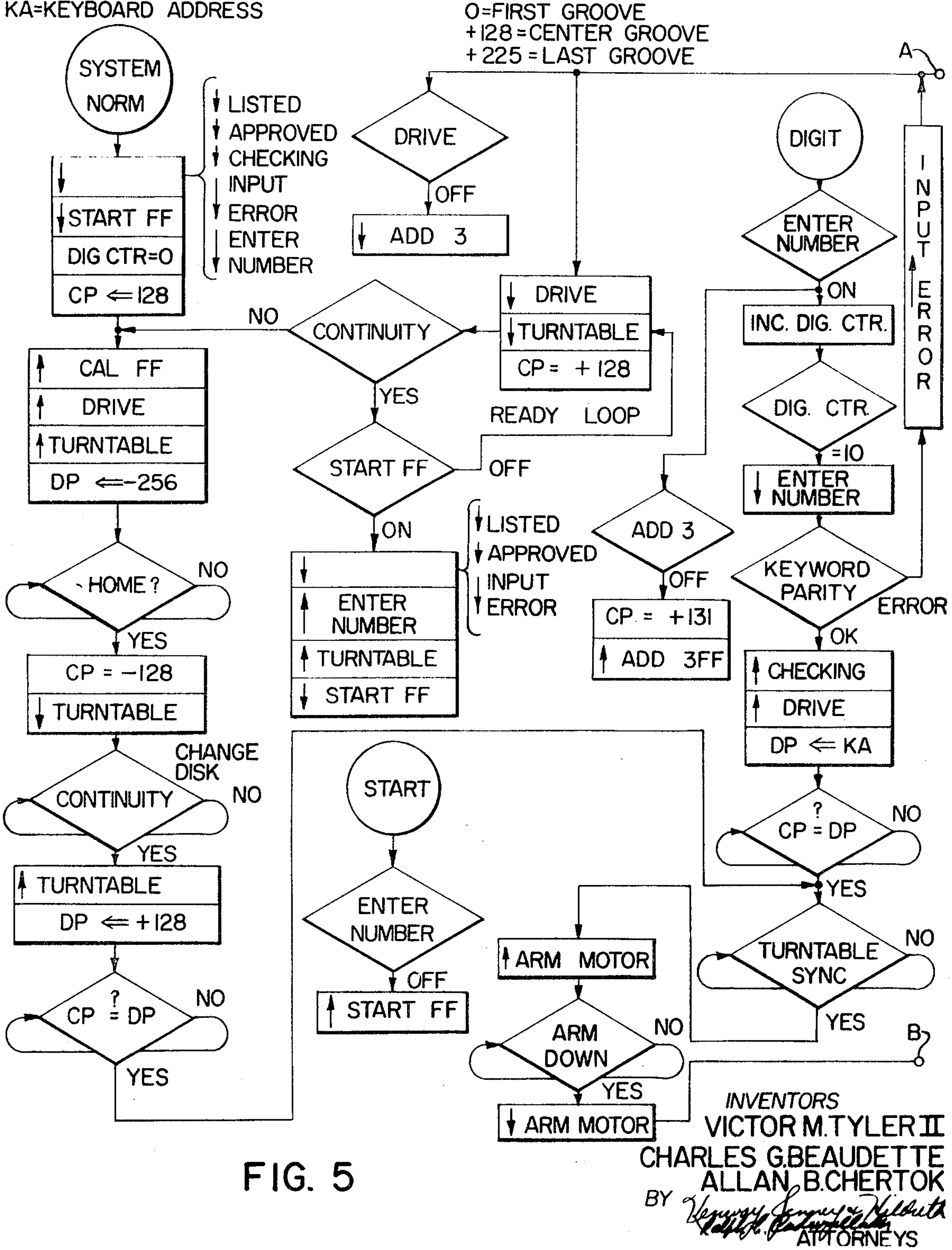

FIG. 5

INVENTORS
VICTOR M. TYLER II
CHARLES G. BEAUDETTE
ALLAN B. CHERTOK
BY
ATTORNEYS

INVENTORS
VICTOR M. TYLER II
CHARLES G. BEAUDETTE
ALLAN B. CHERTOK
BY
ATTORNEYS

INVENTORS
VICTOR M. TYLER II
CHARLES G. BEAUDETTE
ALLAN B. CHERTOK
BY
Kenway, Jenney & Hildreth
Ralph L. Cadwallader
ATTORNEYS INVENTORS
VICTOR M. TYLER II
CHARLES G. BEAUDETTE
ALLAN B. CHERTOK
BY Kenway, Jenney & Hildreth
Ralph L. Cadwallader
ATTORNEYS

LISTING VERIFICATION SYSTEM

SUMMARY OF THE INVENTION

Our invention relates to data processing apparatus, and particularly to a novel comparator for checking a data entry against a recorded list of data entries to determine whether or not it has previously been recorded.

Modern data processing apparatus has been developed that greatly facilitates counting, inventory control and other operations that require a large number of predetermined computations. In general, however, such apparatus is not particularly useful to those who require a small amount of information at relatively infrequent intervals, because the economical use of such apparatus requires that its operating time in preparing the desired information should be significant relative to the time required to set it into operation and obtain the desired results. A particular problem that has not been previously deemed amenable to solution by data processing techniques has been presented by the widespread and growing use of credit cards. In most instances such cards are accepted as satisfactory evidence of the holders' right to charge purchases to the account represented by the card, because otherwise they would have very little utility. However, it is not uncommon for credit cards to be lost or stolen, and subsequently misused. To limit the losses from that cause, the numbers of cards subject to such misappropriation are listed by the company issuing the cards, and such lists are furnished from time to time to those retailers to whom the cards might be presented. However, it is manifestly impractical for a salesman to compare each card as it is presented with a long list of unacceptable account numbers, both because of the delay to the customer and the problem that the salesman's time required would bulk large in comparison with the amount that might be saved by discovering an unacceptable card.

The object of our invention is to facilitate the checking of data entries such as credit card account numbers against a recorded list of entries, such as a list of unacceptable derogatory account numbers, so rapidly and economically that it can be made a routine part of the process of recording a purchase to be charged against a card.

Briefly, the objects of our invention are attained by a novel comparator system incorporating a phonograph adapted to accept a conventional phonographic disk on which there is recorded a list of data entries, such as a list of unacceptable credit card account numbers. The apparatus is provided with a data entry device such as a card reader or a keyboard on which data entries such as an account number can be entered, whereupon the phonograph arm will be set to a position on the disk slightly ahead of the location where the entered number would be recorded if it had been recorded. After the arm has been put in position, control of the system is turned over to apparatus that responds to the information recorded on the disk, first to obtain synchronization with the disk data, and then to compare it with the registered entry until it has been determined that it is either present or that the location on which it would have been recorded has been passed. If the entry has been recorded, an indication that it has will be produced, and if it has not been recorded a second indication will be produced. Since the phonographic disks employed are relatively inexpensive and can be quickly prepared, a given disk can be replaced by a later disk at frequent intervals so that the information on it will always be relatively up to date. Additionally, phonograph disks can be replicated very inexpensively so that the same list may be distributed inexpensively to a large number of comparator stations. With data disks having a few hundred thousand credit card listings carried thereon, a determination of whether a particular entered number is listed can be made in less than five seconds. As will appear, the apparatus is arranged so that any data processing error that may occur will not result in an indication that the data entered has been recorded, but will either ignore the error or produce an indication that the data has not been recorded. That arrangement has the advantages that complex and precise apparatus necessary to insure against all errors is unnecessary, and that, in the particular application of credit card checking, the embarassment and loss of good will that would result from a false indication that the card should not be honored would be prevented.

The manner in which we prefer to construct the apparatus of our invention, and its mode of operation, will best be understood in the light of the following detailed description, together with the accompanying drawings, of a preferred embodiment thereof.

In the drawings are:

FIGS. 5 and 6 are portions of a functional flow diagram illustrating the logical operation of the verifying system of this invention;

DESCRIPTION OF PREFERRED EMBODIMENTS

Figure 1:
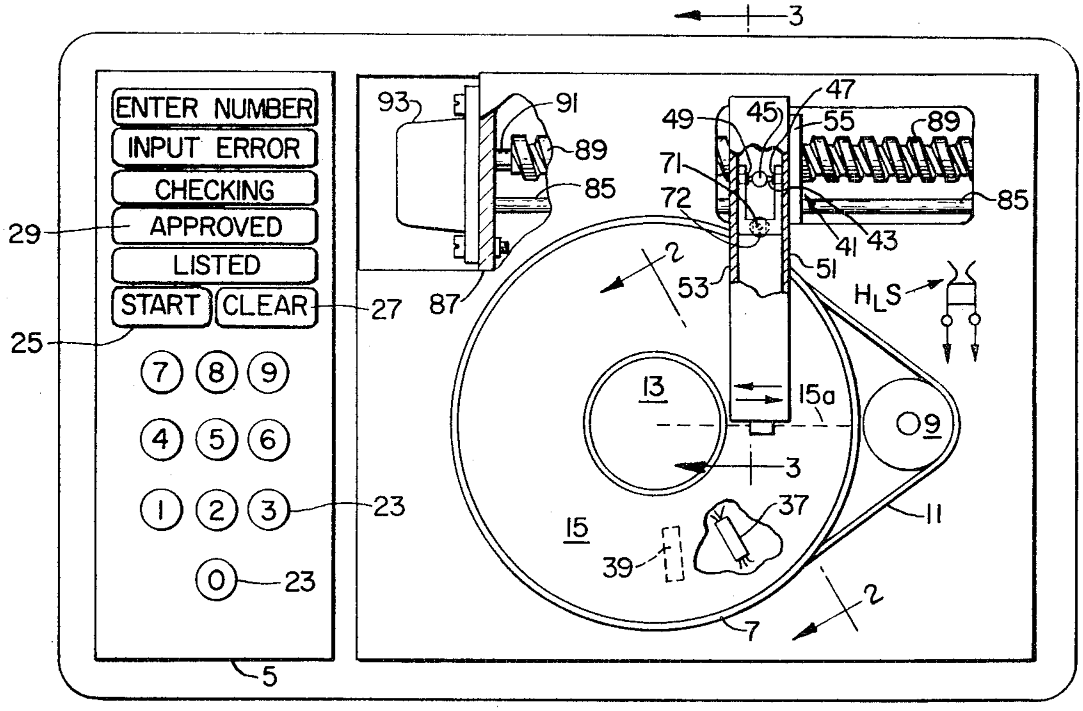
FIG. 1 is a schematic plan view, with parts shown in cross-section and parts broken away, of a phonographic credit verifying system in accordance with our invention.
Figures 3, 4:
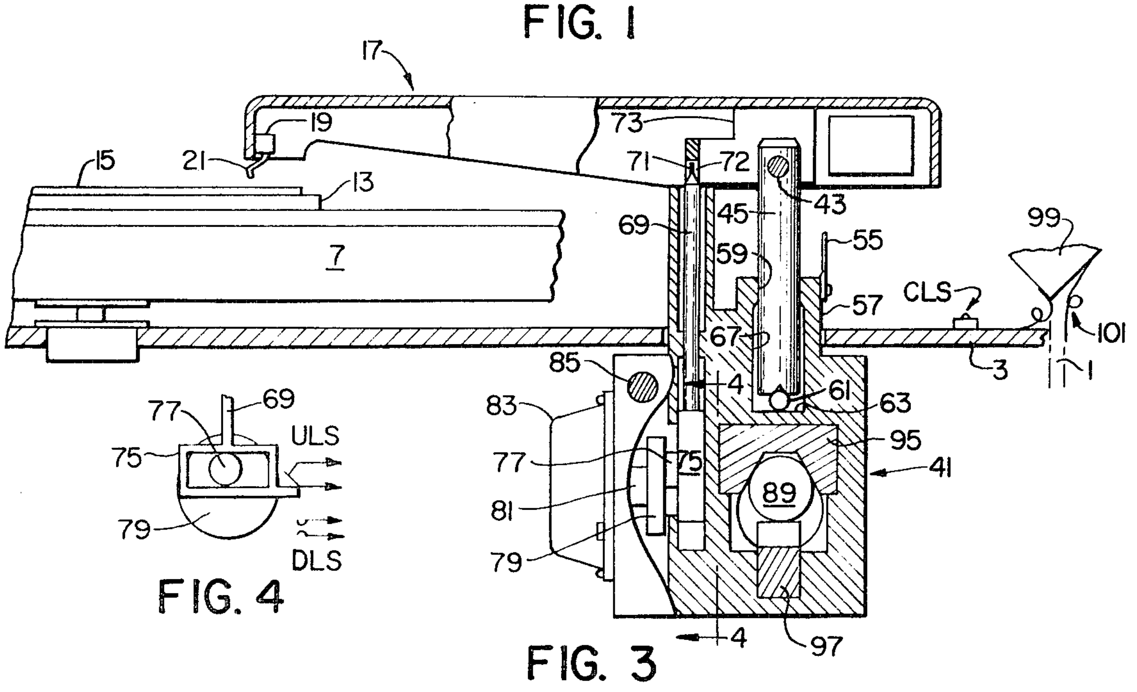
FIG. 3 is an elevational view of the apparatus of FIG. 1, with parts shown in cross-section and parts broken away, taken substantially along the lines 3—3 in FIG. 1.
FIG. 4 is a detailed view of a portion of the arm control apparatus of FIG. 3, taken substantially along the lines 4—4 in FIG. 3.

Referring first to FIGS. 1 and 3, a data verifying system in accordance with our invention comprises a case generally designated 1 in which there is mounted a turntable support plate 3 and a keyboard 5. On the turntable support plate 3 is rotatably mounted a turntable 7 arranged to be driven by a pulley 9 through a belt 11. A center post 13 forming a part of the turntable registers a phonographic recording disk 15 in position to be carried by the turntable beneath a reproducing arm 17 upon which a conventional phonographic cartridge 19 carrying a stylus 21 is mounted (see FIG. 3).

On the keyboard 5 are mounted 10 keys 23 each labeled with a different one of the digits 0 through 9 for entering a number to be verified into the system. Also mounted on the keyboard 5 are a START pushbutton 25, CLEAR pushbutton 27, ad five labeled translucent panels 29 bearing the indicia ENTER NUMBER, INPUT ERROR, CHECKING, APPROVED and LISTED. Lamps are mounted behind each of these panels, so that when one of them is lit the corresponding inscribed indication is visually presented to the user.

Generally speaking, and in terms of the apparatus just described, when the ENTER NUMBER panel is illuminated, a ten digit number may be entered by sequentially depressing the keys 23. The arm 17 will then be driven into the vicinity of the address on which the entered number would be found if it were there recorded, unless some input error had been detected, whereupon the INPUT ERROR panel 29 would be illuminated and nothing further will occur until the CLEAR or START pushbutton is depressed.

If no input error were detected, the apparatus would proceed to lower the arm 17 into engagement with the record 15 and reproduce the information on the record until either the number entered had been discovered whereupon the LISTED panel 29 would be illuminated, or an address beyond that at which the entered number would have been stored was reached, in which case the APPROVED panel 29 would be illuminated. The details of the apparatus for performing those and other functions will be described below.

Figure 2:
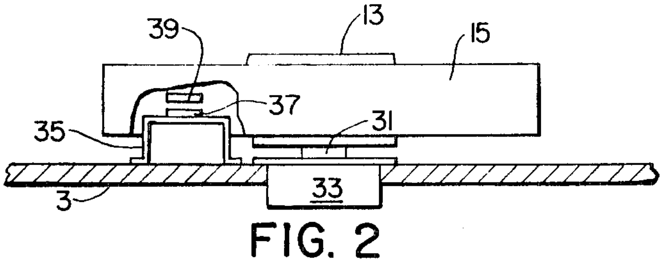
FIG. 2 is a fragmentary elevational view of the apparatus of FIG. 1, on a reduced scale, and taken essentially along the lines 2—2 in FIG. 1.

Referring to FIGS. 2 and 3, the turntable 7 is supported for rotation on the support plate 3 by means of a shaft 31 fixed to the turntable 7 and journalled in a bearing assembly 33 mounted on the support plate 3. Also mounted on the support plate 3 is a bracket 35 to which a magnetic turntable synchronization switch 37 is mounted. The switch 37 is closed once during each revolution of the turntable 7 by means of a magnet 39 fixed to the bottom of the turntable 7 (FIGS. 1 and 2).

The arm 17 is mounted for translation in a direction parallel to a radius of the turntable 7 by a drive assembly generally designated 41. Referring to FIGS. 1 and 3, the arm is journalled for rotation, to move the stylus 21 into and out of engagement with the record 15 on the turntable 7, by means of a jewel bearing comprising a shaft 43 fixed transversely in an upstanding shaft 45 and engaging a pair of jewels 47 and 49 affixed to side walls 51 and 53 of the arm 17. As best shown in FIG. 3, the upward pivotal movement of the arm 17 is limited by a stop plate 55 secured to an upstanding part 57 of the drive assembly 41. The shaft 45 is supported in a guide bearing 59 formed by a bore in the drive assembly 41, and is supported against downward movement and journalled for rotation by a thrust bearing comprising a ball bearing 61 resting at the base 63 of an enlarged bore 67 formed in the drive housing 41.

In the position of the arm 17 shown, it is held at a fixed distance above the record 15 by a pin 69 at the upper end of which is a conical portion terminating in a reduced pin 71. In the position shown, the conical portion between the pin portions 69 and 71 fully engages a tapered slot 72 (FIG. 1) in a bracket 73 secured to the sides 51 and 53 of the arm 17.

The pin 69 is held in the position shown in FIG. 3 when a Scotch yoke 75 is driven to the position shown by a crank pin 77 formed on a crank arm 79, and is moved downwardly so that the pin 71 is clear of the bracket 73 when the pin 77 moves down to its lower position. The crank arm 79 is driven by a crankshaft 81 comprising the output drive shaft of an arm control motor 83.

In the lower position of the crank pin 77, the pin 71 fits loosely in the slot 72 in the bracket 73, and the arm 17 is free to follow the stylus as it tracks the grooves on the record 15, for several grooves ahead of and beyond the groove that should carry the desired address, before the pin 71 again engages the slot in the bracket 73.

In practice, the lost motion thus permitted is made sufficient so that the pin 71 never engages the side of the slot 72 in normal operation. The arm drive housing 41 is supported for sliding movement by a guide rod 85 journalled in flanges such as 87 depending from and formed integral with the turntable support plate 3. The drive housing 41 is further supported and controlled in position by a worm shaft 89 journalled in a suitable bearing attached to the case 1 at the right side in FIG. 1 but not there shown, and is connected at the other end to the drive shaft 91 of an arm position control motor 93 secured to the flange 87.

The top of the shaft 89 engages a smooth guide block 95, as shown in FIG. 3. The bottom of the shaft 89 engages a drive tooth 97 that is secured to the housing 41. It will be apparent that by that arrangement, as the worm 89 is rotated in one direction or the other, the arm 17 will be translated in a direction parallel to a radius 15*a* of the record 15 so that it will successively traverse the grooves recorded on the record.

As shown in FIG. 3, the case 1 is preferably provided with a cover schematically shown in fragmentary form at 99 and hinged, as suggested at 101, to the case 1. A continuity limit switch is preferably mounted on the base plate 3, or in another suitable position, to be closed by the cover 99 when it is in place, and thereby producing a signal indicating that the apparatus has been put in operation and can proceed to operate without interference with the record or the arm by the operator.

THE DATA DISK

In one preferred embodiment the data disk is formed of a 7 inch phonograph record of the type used for 45 RPM operation. The disk has inscribed on it a continuous spiral track running from near the outer edge to a point perhaps halfway in on the radius of the disk. The spiral is divided into equal parts called grooves with the innermost groove designated as +255 and the outer most groove as 0. It will be understood that the length of the segments designated as grooves will be selected according to the numbers of addresses required. The data is recorded in the grooves in binary coded decimal. While the particular symbol format utilized will depend upon the number of bits required to be stored, one suitable symbol format is described in pending application Ser. No. 788,441, for Method And Apparatus For Storing Digital Data, filed on Jan. 2, 1969 and assigned to the assignee of this application. The information is stored on the disk in the form of words, each of which is a ten digit number, which are the identifying numbers on a credit card. Each digit is stored in binary coded decimal. These words are recorded serially, such that the highest ordered digit of each word and the highest ordered bit of each digit are reproduced first when the stylus is moving inwardly on the disk. In this embodiment, the lowest order bit of each of the last eight digits of each word is used as the address for the number, that is, all numbers having the same lowest order bit for each of their last eight digits are stored in one groove location. It will be apparent that, since there are only eight such address bits and the words are forty bits each, then for each address there will be a large number of possible entries. Therefore, in recording the disk, those numbers which have a common address are located on the groove assigned that address and are arranged in ascending sequence of the whole ten digit number. Such an arrangement provides for relatively even distribution of the numbers over the disk, if the lowest ordered bits of the various numbers are substantially randomly distributed. This provides for substantially even distribution of the numbers over the disk and therefore allows for the highest packing density of derogatory accounts on the disk. This particular embodiment is useful for a large class of credit identification number distribution schemes. More generally, where the natural order of the credit card identification number distribution is not a random one, sub-sets of lists within the numbers may be selected in natural order. These bits may be but do not have to be contiguous. This sub-set may first be sorted out in natural order and all numbers within each enclosed set may also be sorted in natural order. In these sub-sets the order of bits should start with the least significant bit, but the words may be ordered with either the least significant or most significant word first.

In addition to the data words recorded on the disk, there are two other types of signals encoded. One type of non-data word signals are fill words which are used to fill out the space in a groove for which there are no data word entries. The second type of non-data words are sync words which are used to enable the logic circuit to determine which bits are the initial bits of data words. In this embodiment there are five sync words per groove, the fill word format is entirely binary ones, and the sync word is formed of 44 ones followed by the code 0101.

Each of the data words, as above indicated, represent a 10 digit credit card identification number. In order to provide an added security feature each of the credit card numbers are arranged in a format to provide for a mathematical parity check. In one example, the parity check may consist of performing certain computations on the numbers in the digit locations 2, 4, 6 and 8 and other operations on the numbers in the digit locations 1, 3, 5, 7 and 9, with the result of these computations, when combined, providing a specific digit for the tenth digit. Thus, if any data word, either from the data disk or entered in from the keyboard or any other data entry means, fails to meet a parity test, there has been an error somewhere and the overall comparison operation is not performed with respect to that word.

FUNCTIONAL OPERATION OF THE DATA COMPARATOR SYSTEM

Figure 6:
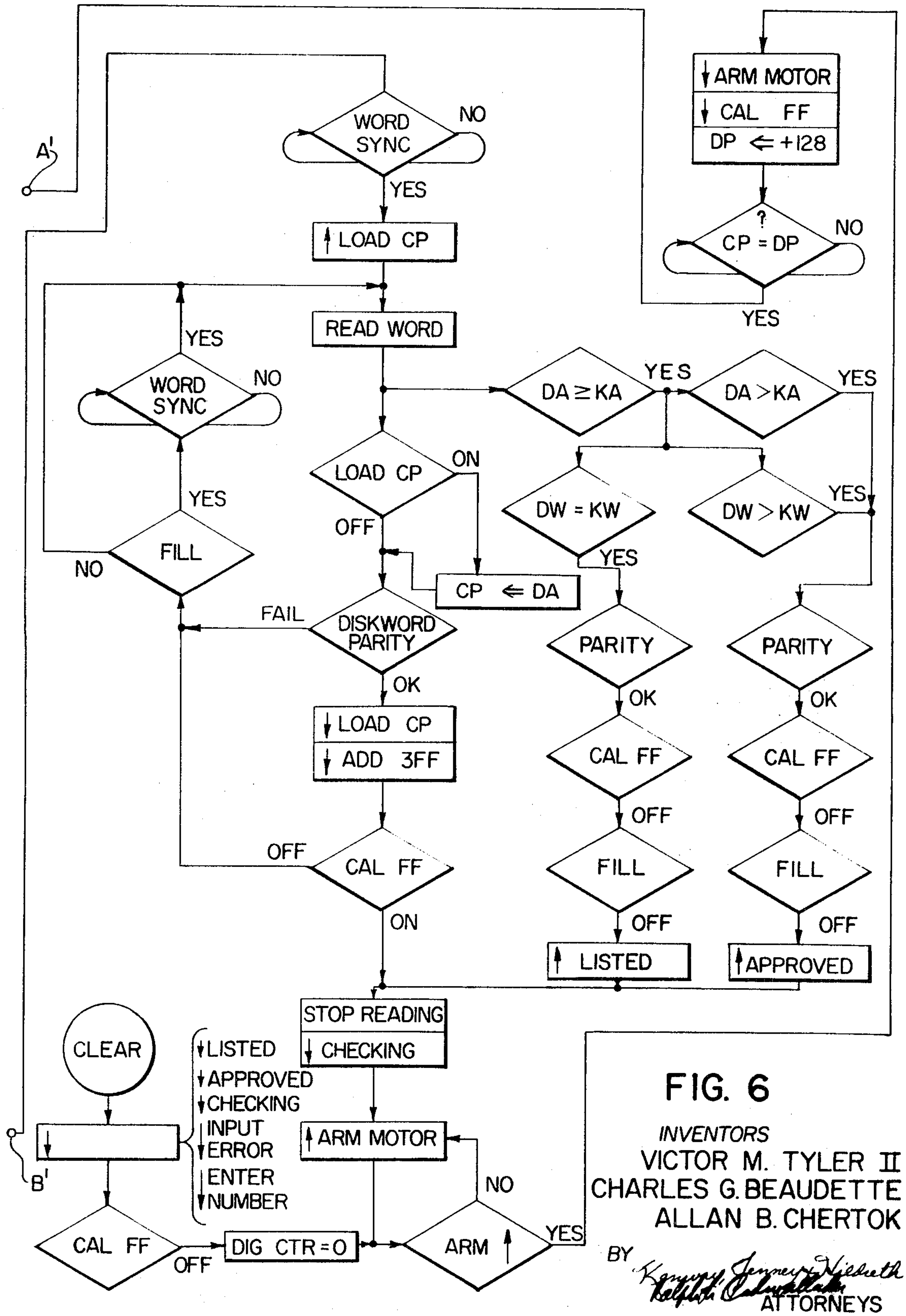

FIGS. 5 and 6, combined, form a logic flow diagram for the functional operations of the data comparator system described herein. Before describing an arrangement of logic elements to perform these functions the entire functional operation of the device will be discussed. In general the system may be considered as performing three separate but related functions. One function is the basic data comparison function which comprises entering a number, typically from a keyboard, and looking up that number on the data disk to see if it is listed. The other two functions are both support functions for this basic purpose. One of these functions is a calibration function which has for its purpose a precise alignment of the phonograph stylus with a specific numbered groove on the data disk. This is a separate calibration step from the normal recalibration which, as will be discussed below, takes place each time a number is looked up. The third function is a sequence which presets the circuit conditions in the system when the unit is first connected to a power source. Since the system has no off-on switch, this connection to the power source initiates a sequence of checks which insure that the controlling elements are in the correct starting position, irrespective of what condition the machine was in at the time the power was removed.

In FIGS. 5 and 6, the rectangular blocks indicate control functions, which most usually are accomplished by setting or resetting flip-flops so that the controlled condition either exists and is therefore regarded as "ON" or does not exist and is therefore regarded as "OFF." An upward directed arrow within the box indicates that the controlled element is in its set position. The diamond shaped blocks in the figures represent a functional comparison calling for a determination as to whether a specific condition exists or not and providing output answers to further elements. The circles represent manually operated control functions. In FIG. 5, a key for the abbreviations used for various functions is set forth.

The initial function to be described will be the data comparison function and it will be assumed that the unit has been calibrated and that the stylus is precisely above groove 128, which is the center groove on the disk. The operator pushes the START button which, if the ENTER NUMBER condition is off, turns on the start flip-flop. If the ENTER NUMBER has already been actuated then the START button can perform no function. The operator now pushes the first digit number to start entering into the system the ten digit number to be looked up. Depression of the digit number will actuate this system only if the ENTER NUMBER condition is present.

The conditions which are required for the ENTER NUMBER condition to exist arise from the Ready Loop which is a self-contained loop and represents the standby condition of the system. The system is in this standby condition after it has completed looking up a number or after a calibration has been completed. The Ready Loop includes a number of specific conditions of control functions including, DRIVE control off, which turns off the power to the arm translation stepping motor, TURNTABLE off which turns off the turntable motor and a control function which provides that the CURRENT POSITION data register is maintained at +128. Additionally, the Ready Loop includes a determination of whether the START flip-flop is off or on and whether there is CONTINUITY present. The CONTINUITY condition is met when the cover of the device is closed so that the interlock switch is actuated. If therefore the cover is closed and the START button has not yet been pushed, the Ready Loop maintains the stepper motor and the turntable motor off and the current position value at +128 on a steady standby basis. Actuation of the START button, which results in the START flip-flop being turned on, then breaks this chain of conditions and the START flip-flop determination provides an on response. This on response in turn guarantees that the LISTED, APPROVED and INPUT ERROR conditions are off, actuates the ENTER NUMBER control element, actuates the TURNTABLE MOTOR, and then turns off the START flip-flop.

If one of the digits is now actuated, the ENTER NUMBER condition control element is on and the actuation of that digit enters the digit and an input register increments a digit counter, which counts how many digit buttons have been pushed in succession, in order to determine when the entire ten digit word is in and thus to commence a comparison. If the ADD THREE control element is off, entry of this digit sets the CURRENT POSITION register to +131 and turns on the ADD THREE flip-flop. The ADD THREE portion of the function simply provides for a margin against radial entrance error; that is, it provides that the phonograph arm, instead of being sent to the groove which is the proper address of the word entered, is sent to a groove which is three turns outside of that addressed groove. Since the phonograph turntable only turns in one direction, the motion imparted to the stylus from the record when the arm is down and engaged in the groove is unidirectional. Thus in order to insure that small errors in arm positioning do not result in the arm engaging the disk at a position further in than the address it is looking for, the arm is always sent to a psoition further out than the sought address. As will be seen this is accomplished by performing the computation between the center position and the entered address position in such a way that the result is off by a fixed number of grooves. In this embodiment the number is nominally three grooves. Specifically this is accomplished by inserting the information in the CURRENT POSITION register that the arm center position is at +131, when in fact, it is at +128.

As each digit is depressed, the code is entered into a 40 bit recirculating KEYWORD STORAGE register (which is not shown on the flow diagram) and, when the digit counter condition reaches 10, representing 10 digits having been entered, then the ENTER NUMBER control element is turned off, thereby inhibiting any further action by depression of any of the digit buttons.

Once the tenth digit has been entered a determination is made whether the keyboarded word passes the parity check. If it does not do so, then an element designated INPUT ERROR is actuated and the system is put back into the Ready Loop standby condition. If the parity check is correct, then an indicator is actuated which signals that the unit is in a CHECKING condition, the DRIVE control supplying power to the arm stepping motor is actuated and a DESIRED POSITION value equal to the address of the keyboarded ten digit word is supplied in the form of serial bit stream. The bit stream presented at this DESIRED POSITION terminal is compared with a bit stream generated from the CURRENT POSITION data register. It will be recalled that this CURRENT POSITION register had the address +131 entered into it. The comparison made is a dynamic one in which additional signals are generated to bring the bit stream for the current position into substantial identity with the bit stream for the desired position. These additionally generated signals are used to drive the stepping motor so that the arm and hence the stylus are driven to a position above a groove which is three turns outside of the groove identified by the keyboard address.

When this arm movement has been completed, an actuating signal is provided to turn on the arm up/down motor, as soon as a turntable sync signal has been received indicating that the magnetic reed switch has been actuated by the element on the turntable. The arm motor is driven downwardly until it reaches a lower limit switch and, when that switch indicates that an arm is down the arm motor is turned off. At this point the stylus is engaged in the groove on the record which is intended to be three grooves outside of the address wherein the keyboard entry, if it is listed would be found.

The information on the disk is sensed by the stylus and decoded in the decoding circuit which provides both an output clock signal, indicating the bit positions in the signals read from the disk and the bit levels themselves. For the purpose of comparison, data is stored in an eight bit shift register as it comes from the decoder. The first determination made on the decoded stream of bits is whether or not a sync word has been detected. It will be recalled that there are five sync words per groove and that these provide the basis for identifying the initial bits of data words. Once a sync word has been identified, the LOAD CURRENT POSITION (LOAD CP) control element is turned on and the read word (READ) control is adjusted. A determination is then made of whether the LOAD CP control is actuated. As will appear below this control will be actuated until a disk word has passed a parity check and after that this control element will be off. When the LOAD CP is on then the disk address is entered into the CURRENT POSITION register and the parity of the entire disk word is computed. If the disk word parity computation indicates that the parity check fails then a determination is made if the word being checked is a fill word. If it is not a fill word then the read word control is again actuated and the entire cycle is repeated. If the determination is made that it is a fill word, then a check is made to determine whether it is a sync word. If it is a sync word then the cycle is reactuated and if not then the entire loop keeps operating until a sync word does appear.

When a word on which the parity check is approved is read then the LOAD CP control element is turned off and the ADD THREE element is turned off. If the CALIBRATION flip-flop is off then the entire loop keeps operating thereby entering successive words from the data disk.

As each word is read a determination is made whether the address of the word from the disk, that is, the disk address is less than or greater than the keyboard address. If the disk address is smaller than the keyboard address, no action is taken on the word, and the comparison is made again on the next word read. If the disk address, at any time, is greater than the keyboard address and the word from the disk which carries this address provides a correct parity computation and the CALIBRATION flip-flop is off and the word is not a fill word, then a signal is provided indicating that the keyboard entered number is APPROVED, that is it is not listed on the disk. Similarly, if the disk address is not smaller than the keyboard address and not larger than the keyboard address, that is, if they are equal, and yet if the complete disk word is greater than the complete key word then again, provided that the parity check is met, the CALIBRATION flip-flop is off and it is not a fill word, a signal is provided that this keyboard entry word is APPROVED.

If, on the other hand, the disk address is the same as the keyboard address and the disk word is not smaller than the keyboard nor larger than the keyboard word, that is, when the keyboard word is the same as the disk word, then the signal is provided indicating that the keyboarded entry was LISTED, provided that the parity check is correct, the CALIBRATION flip-flop is off and the word is not a fill word.

When a word is either LISTED or APPROVED the system is instructed to stop reading, the CHECKING indicator is turned off and the arm updown motor is actuated to lift the stylus out of engagement with the data disk. When the arm motor is all the way up, the arm motor control is shut off and a level 128 signal is provided at the DESIRED POSITION terminal. The comparator system for equalizing the current position and the desired position is then actuated to step the drive motor until the CURRENT POSITION register is at +128 corresponding to the stylus being positioned over groove location 128. It should be noted that the amount of movement is determined by the difference between the 128 position and the current position loaded at the first parity check word after the sync word. The drive motor power is then turned off, as is the ADD THREE control element and the turntable motor and a 128 level is set and maintained in the CURRENT POSITION register. At this point the system is again in the Ready Loop and prepared for the next entry.

The calibration cycle takes place when a new disk is placed on the turntable and has for its purpose the precise positioning of the arm over the groove 128 on the data disk. If the system is in the Ready Loop and the continuity is broken, that is, if the cover is lifted then the CALIBRATION flip-flop is turned on and the drive motor and turntable motor are turned on. A −256 signal is provided to the DESIRED POSITION terminal. This causes the stepping motor to move the arm outwardly toward a position at −256, which would nominally be a spacing of 256 grooves outside of the outer disk position. As the arm moves away from the center of the groove beyond the limits of the data disk, it will strike and actuate a home switch, which is positioned at a distance approximately equivalent to a spacing of 128 grooves outside of the data disk. Once this switch has been actuated a −128 level signal is applied and maintained to the CURRENT POSITION register and the turntable motor is turned off.

The system is now in condition where a new data disk may be substituted for the old since the phonograph arm is well away from the disk itself in its HOME POSITION. Once the new disk has been placed on the spindle no further action takes place until the cover of the unit is closed thereby establishing continuity. Once continuity has been reestablished, the turntable motor is turned on again and a signal level of °128 is supplied to the DESIRED POSITION terminal. The DESIRED POSITION is then compared to the CURRENT POSITION register and used to count that register until the current position is the same as the DESIRED POSITION, in this instance +128. The signals used to perform this count, step the drive motor to move it 256 steps from its home position. It should now be reasonably close to being over the center groove of the data disk. At this point in the sequence, the next closing of the magnetic reed switch indicating a specific angular position of the turntable causes the arm motor to be actuated driving the arm motor down toward engagement with the disk and once the stylus is down and engaged the arm motor is turned off and the system commences its determination of whether a sync word has been detected.

When a sync word has been detected the LOAD CP control is actuated and the READ control is actuated. Then, as in the case of reading a word during the general comparison function, the CURRENT POSITION register is supplied with the actual disk address on the disk and, if disk word parity is achieved than the LOAD CP control and the ADD THREE flip-flop are turned off. Since the calibration flip-flop is on, then the sequence now moves directly to turn off the READ control element and to drive the arm motor up. Once the arm motor is up, the arm motor power is turned off and the calibration flip-flop is turned off and a +128 level is supplied to the DESIRED POSITION terminal followed by a countdown to render the current position the same as the desired position. Thus if the actual current position established in moving from the off the disk home position is somewhat different from 128, the disk address read will differ from +128 and in this countdown after the turning off the arm motor and the calibration flip-flop the drive power will move the arm to a position precisely over the 128 groove. At this point the drive power and turntable power are turned off and the CURRENT POSITION register level is set at + 128. The system is once again in Ready Loop and is now ready to start data comparisons.

The third function of the overall system is the normalization which takes place when the power is first applied. The application of the power actuates a SYSTEM NORMALIZE switch which turns all of the lights off, resets the start control element if it is on and resets the digit counter to zero as well as establishing the CURRENT POSITION level at 128. Having done this the calibration cycle is actuated and the calibration sequence will be followed as in the normal calibration situation.

This system also has a CLEAR control which permits the operator who enters a wrong digit to clear the device and start over. Actuation of the clear push button turns off all the lights and, if the calibration flip-flop is off it then initiates an end of cycle procedure which establishes that the arm is up, the arm motor is turned off, the CALIBRATION flip-flop is turned off and the arm itself is positioned at +128.

While all the functions have been described in terms of a specific embodiment of a data comparator, it will be realized that a number of these functions may be either changed or omitted, depending upon the specific system designed. For example, there may be a number of comparator situations in which it is unnecessary to check key word parity. Thus the key word parity operations may be eliminated and, in a practical sense, a system may be designed so that this function can be added to or subtracted from the system simply by a relatively minor switching change or insertion of a printed circuit board.

THE DATA DECODING

Figure 7:
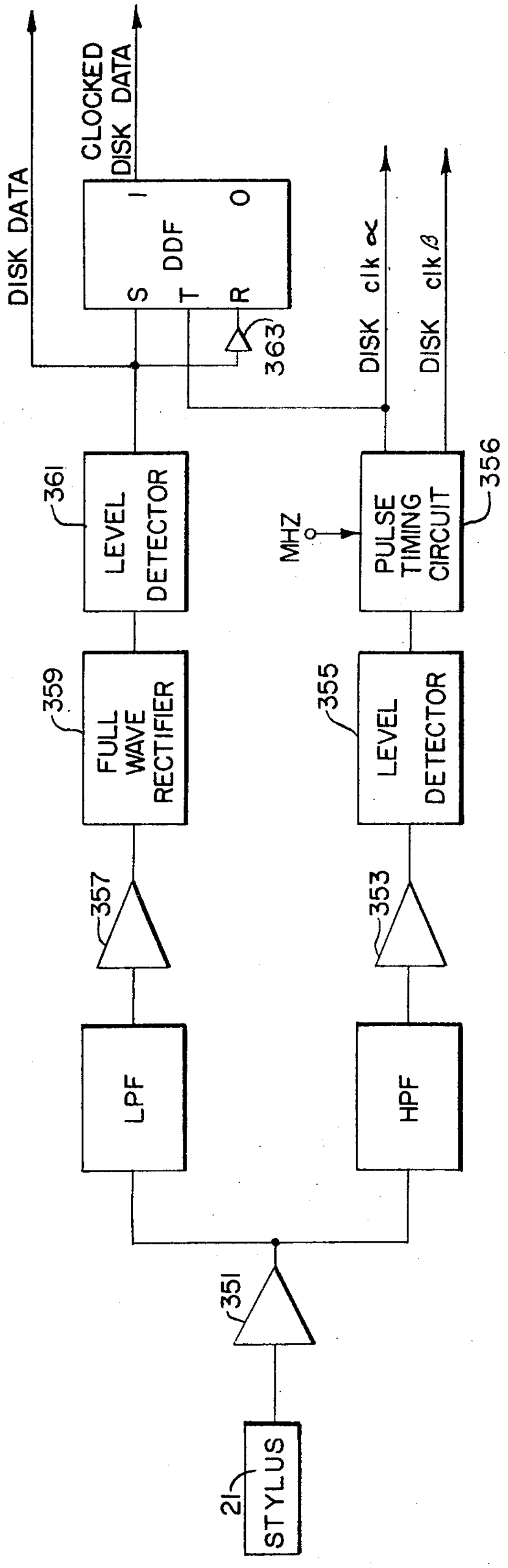
FIG. 7 is an illustration in block diagrammatic form of a data decoding system useful in the practice of this invention.

The apparatus for decoding the data from the disk is shown in block diagram form in FIG. 7. As shown in FIG. 7, the stylus 21 is connected through a conventional amplifier 351 to a low pass filter LPF and a high pass filter HPF. The high pass filter detects a clock train which is essentially recorded as a sine wave at the data rate, $F_D$. The low pass filter responds to data recorded in a train with an upper frequency limit of $F_D/2$. Such recording may be accomplished by various methods, but the preferred one is that disclosed and claimed in the copending application Ser. No. 788,441 filed on Jan. 2, 1969 by Allan Chertok for "Method and Apparatus for Storing Digital Data", and assigned to the assignee of this application.

The output of the high pass filter HPF is supplied through an amplifier 353 to a level detector 355 that produces an output each time the signal that has passed through the high pass filter HPF goes above a predetermined level with a selected polarity. The result is a square wave signal which is applied to a pulse timing circuit 356. This circuit may be formed of a pair of flip-flops triggered at the rate of several megahertz and AND gates arranged such that two trains of narrow pulses are generated, one designated DISK CLK$\alpha$ and the other DISK CLK$\beta$, the latter pulses occurring halfway between the former. Both pulse trains are synchronized with a megahertz (MHz) rate clock signal produced by the logic circuitry. The DISK CLK$\alpha$ pulses serve as the basic clocking pulses for synchronizing the data bits, while the DISK CLK$\beta$ pulses are used to provide a time base for related logical operations.

Figure 8:
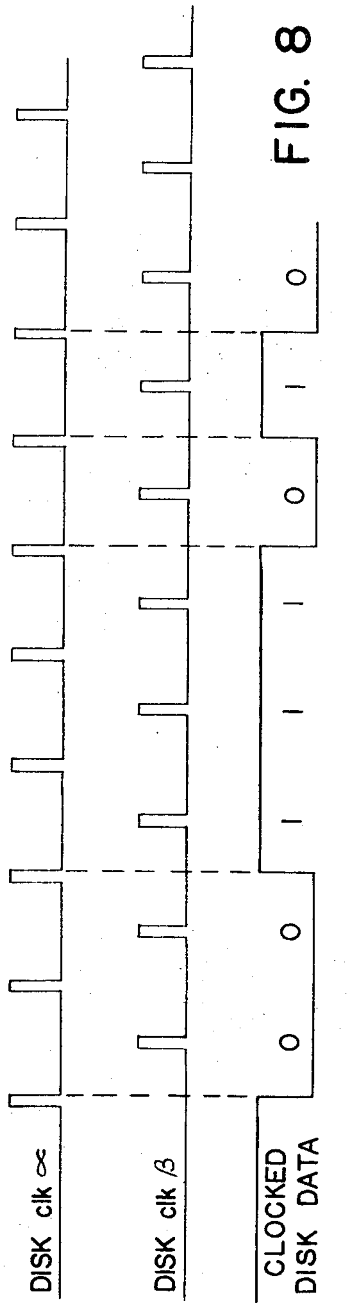
FIG. 8 is an illustration in graphical form of the pulse trains produced as an output from the decoding system of FIG. 7.

The low pass filter frequency discriminates against the clock train and passes the recorded data through an amplifier 357 to a full wave rectifier 359. The output of the full wave rectifier 359 is supplied to a second level detector 361. The output of the level detector 361 is applied directly to the set/enable terminal of a synchronous flip-flop DDF, and through an inverter 363 to the reset/enable terminal. The trigger terminal of the flip-flop DDF receives DISK CLK$\alpha$ pulses from the timing circuit 356. The state of the DDF is accordingly determined by whether the output of the level detector 361 is present or not present at the occurrence of each DISK CLK$\alpha$ pulse. FIG. 8 shows the output signal trains from the level detector 361 for a logical signal 100111010, as well as the DISK CLK$\alpha$ and DISK CLK$\beta$ signal trains. The level detector 355 is set to respond to either the high or the low level signal to produce the train of clock pulses. The level detector 361 is set to respond only to the high level pulses, but to pulses of both polarities by reason of the full wave rectifier 359.

DESCRIPTION OF THE DATA PROCESSING SYSTEM

Figure 9:
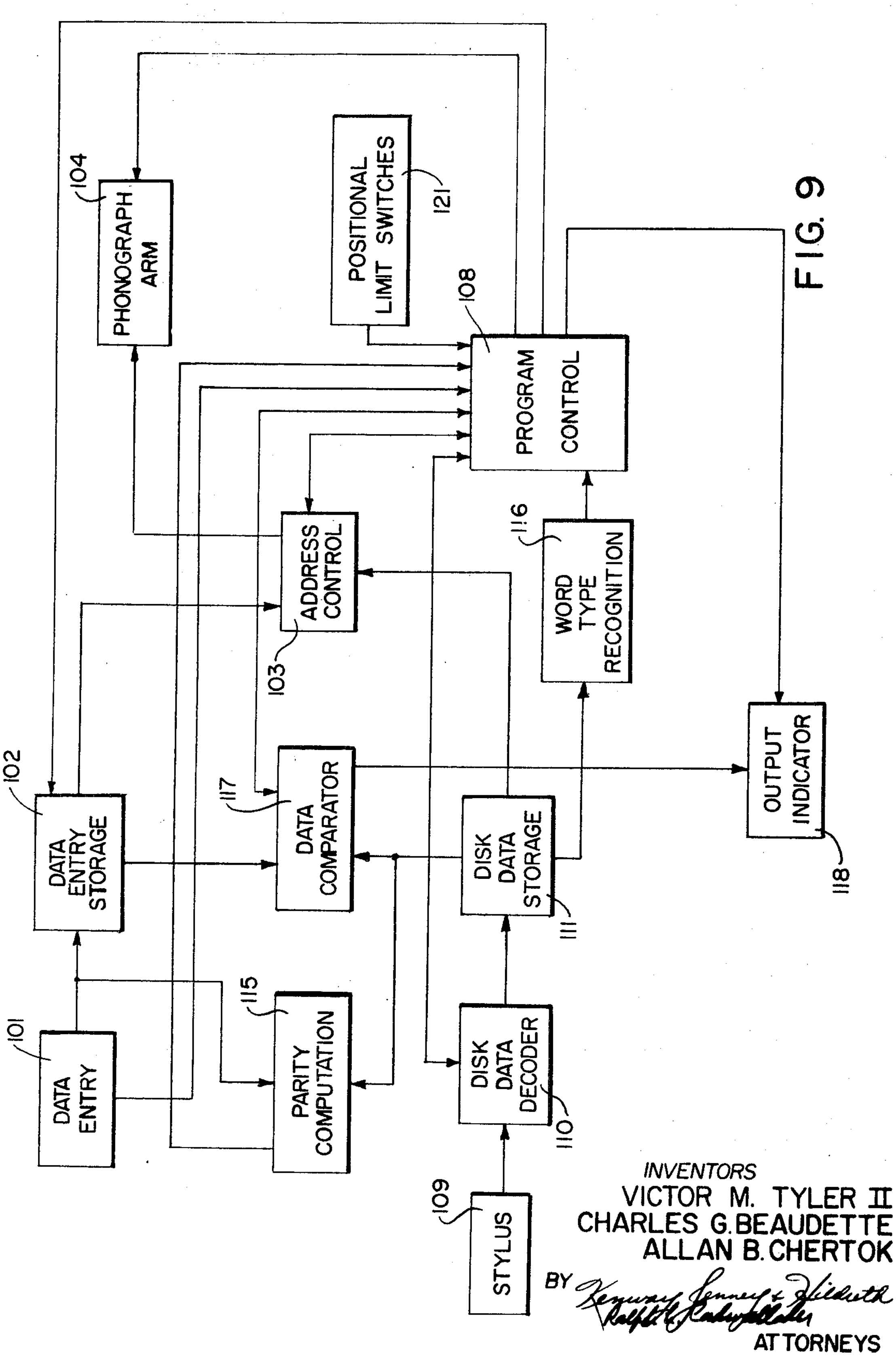
FIG. 9 is an illustration in block diagrammatic form of a data processing system for use in the verifying system of this invention.

In FIG. 9 there is illustrated in block diagrammatic form a data processing system for implementing the logical function described in conjunction with a flow diagram of FIGS. 5 and 6. In FIG. 9, the data entry means 101, which as indicated earlier, may be a keyboard or an automatic reading device, provides for entry of the identification number data to be compared into a data entry storage unit 102 while simultaneously checking the parity of this number in a parity computation unit 115. The data entry means 101 also provides a signal to a program control unit 108. It is the function of the program control unit 108 to control the entire sequence of the data comparison process by actuating appropriate selected logic sub-systems at appropriate times. The data entry storage means 102 performs the function of storing the 40 bit entered data word for purposes of both determining the appropriate address on the disk and for comparing the data entries at the appropriate address with the entered data word. The data entry storage unit 102 provides outputs to both the address control 103 and a data comparator unit 117. In addition to receiving the input from the data entry unit 101 the data entry storage 102 also receives a controlling input from the program control unit 108. If the parity computation on a number to be entered into storage fails, then this control input inhibits the storage of that number.

The address control unit 103, in response to program signals from the program control unit 108 and to data signals from the data entry storage 102, generates output signals to control the position of the phonograph arm 104 with respect to specific groove locations on the data disk. The phonograph arm position is controlled, as indicated earlier, by a stepping motor and the address control unit 103 generates output signals to control the operation of this motor.

The data comparator unit 117 to which the data entry storage output is also provided, has a second data input from the output of the disk data storage unit 111 which temporarily stores the digital data from the disk. The data from the disk is provided to the disk data storage 111 through the phonograph stylus 109 and the disk data decoder 110. Both the decoder 110 and the comparator 117 receive sequence control signals from the program control unit 108 and provide signals to it.

The information from the disk data storage unit 111 is also coupled to a parity computation circuit 115 and to the address control unit 103. The parity computation circuit 115 determines whether each data word read from the disk meets the parity check and also checks parity for each data word entered into the data entry storage unit 102. At one point in the program, the address control unit 103 acts, as indicated in the discussion with respect to FIGS. 5 and 6, to store the address read from the disk to indicate the current position of the phonograph arm. The disk data storage unit 111 also provides output signals to a word type recognition unit 116 which determines whether the word received at the disk data storage unit 111 is a data word, a fill word or a sync word.

An additional input to the program control unit 108 is provided from the positional limit switches 121. These switches indicate when the phonograph arm has moved away from its center position over the data disk to a home or rest position off the disk, and also whether the phonograph arm is in its up position disengaged from the groove on the data disk or in its down position indicating that the stylus is engaged with the groove on the data disk.

The precise manner in which the logic sub-systems are formed will control to a significant degree the manner in which they are interconnected to perform the various functions. In general the units will include conventional logic elements, such as gates, shift registers, counters and the like. One preferred embodiment for implementing this overall logic system is described in the application of David R. Spencer entitled "Random Access Comparator," Ser. No. 844,973, assigned to the assignee of this application filed of even date herewith.

What is claimed is:

1. A data comparison system comprising, data entry means for entering a specific digital signal sequence to be compared into said system;

storage means for storing said entered digital signal sequence;

a phonograph record having a train of signals representing digital sequences serially recorded in a predetermined order in a continuous track thereon, said train of signals being ordered in groups of words according to a predetermined plan, each of the words within a group being ordered in natural order, a phonograph including a movable sensor for reproducing said train of signals; and comparator means coupled to said storage means and said phonograph for comparing the contents of said storage means with signals recorded on a record and producing a first output signal when the signals received from said phonograph represent the same digital sequence that is entered into said storage means and a second output signal when the specific digital sequence entered into said storage means is not recorded on said record, and means for addressing that group of words within which said signals representing specific digital sequence would be located according to said plan, said addressing means including positioning means for positioning said sensor in juxtaposition to said addressed group, said second output signal being provided when said phonograph reproduces a signal sequence from the same group of words as said specific digital sequence representing a digital sequence of greater value in the natural order than said specific digital sequence.

2. A data comparison system for determining whether a specific card identification number is included in a selected list of identification numbers comprising, data entry means for entering the specific card identification number into said system;

storage means for storing said entered number;

a phonograph record having inscribed thereon in a continuous spiral groove said selected list of identification numbers in predetermined serial order;

readout means for sensing the numbers inscribed on said record;

readout positioning means responsive to the entry of a specific number in said storage means to position said readout means in operative juxtaposition to that portion of said spiral groove in which said specific number would be located according to said predetermined order and a comparator coupled to said storage means and said readout means for comparing the number entered into said storage means with the numbers listed on said record and providing a first output indicating said specific identification number is listed and a second output indicating said number is not listed.

3. A credit verifying system comprising, data entry means for selectively producing a sequence of digital character signals to identify the account number to be verified, each character comprising an ordered sequence of bit signals;

a word register connected to said data entry means for registering a predetermined number of said signals as a data word;

a phonograph for verifying the status of individually numerical accounts for reproducing data representing a list of derogatory accounts recorded in a spiral groove on a phonograph record said phonograph comprising, a support, an arm, a stylus on said arm, and means mounting said arm on said support for translation of the stylus along a path that is normal to the groove of a record on said phonograph and for rotation between a first position in which said stylus will engage a record on said phonograph and a second position in which said stylus is out of engagement with a record on said phonograph, means controlled by said word register when said arm is in its second position for translating said arm to a starting position relative to a record on said phonograph said starting position being determined by an address field related to the account number to be verified;

means responsive to the position of said arm for rotating said arm to its first position when said arm is in its said starting position, transducing means responsive to said stylus when said arm is in its first position for producing a data signal in accordance with the data recorded on a record on said phonograph, comparator means controlled by said word register and said transducing means for comparing said data signal with the contents of said word register, output means controlled by said comparator means for producing a first output signal when a word represented by said data signal agrees with the word stored in said word register, and for producing a second output signal when the address field of a word represented by said data signal is in a predetermined relation to the address field of the word stored in said word register indicating that the stylus is beyond the position on the groove of a record on said phonograph at which the word in said word register would have been recorded, means controlled by said output signals for moving said arm to its second position when either signal is produced, and indicating means responsive to said output signals for producing an indication identifying the output signal that was produced.

4. A data comparison system, comprising, a first support, a record carrier journalled on said first support for rotation about a predetermined axis and adapted to receive a phonograph record on which a list of data words is serially recorded in a continuous spiral groove, drive means connected to said carrier to rotate it about said axis and thereby advance a stylus engaging a record on said carrier along said groove, a second support means mounted on said first support for translation along a second axis, an arm rotatably mounted on said second support for rotation about a third axis for movement between a first position adjacent said carrier and a second position farther from said carrier, reproducing means comprising a stylus connected to said arm and for engaging a record on said carrier in the first position of said arm, said second axis being so disposed relative to said first axis to that said second support is translated along said second axis, said stylus is moved along a path that is normal to said groove, transducing means connected to said stylus for producing an electrical data signal in accordance with the recorded data on a record on said carrier in the first position of said arm, signal generating means responsive to the rotational position of said carrier for periodically producing a synchronization signal at a predetermined rotational position of said carrier, a data word register, data entry means for entering a data word into said word register, means controlled by a subfield of data in a word stored in said register when said arm is in its second rotatable position for moving said second support to carry said arm to a starting position relative to a record on said carrier determined by said subfield, means responsive to said synchronization signal when said arm is in said starting position for moving said arm to its first rotated position, comparator means controlled by said transducer and said word register when said arm is in its first rotated position for comparing said electrical data signal with the contents of said word register, means controlled by said comparator means for producing a first output signal when a data word represented by said electrical data signal is identical with the data word in said word register, means controlled by said comparator means for producing a second output signal when the subfield of a data word represented by said electrical data signal is in a predetermined relation to the contents of said subfield and means controlled by said output signals for moving said arm to its second rotated position when either output signal is produced.

5. A data comparison system comprising, data entry means for entering a specific digital signal sequence to be compared into said system;

storage means for storing said entered digital signal sequence;

a phonograph record having a train of signals representing digital sequences recorded in a predetermined order in a continuous track thereon, said train of signals being recorded on said phonograph record in a sequence of address fields identifiable from the signals;

a phonograph including a movable sensor for reproducing said train of signals;

comparator means coupled to said storage means and said phonograph for comparing the contents of said storage means with signals recorded on a record and producing a first output signal when the signals received from said phonograph represent the same digital sequence that is entered into said storage means and a second output signal when the specific digital sequence entered into said storage means is not recorded on said record, the specific digital signal sequence entered into said word register having encoded within it an address location specifying the address field on a phonograph record of the type recited in which that specific digital signal sequence would be recorded, means for positioning the sensor on that portion of the phonograph record designated by the specified address field; and comparator means providing said second output signal when said specified address field has been passed without the comparator means receiving a signal sequence from said phonograph representing the same digital sequence entered into said word register.

6. The apparatus of claim 5 in which said phonograph comprises a reproducing arm, a turntable adapted to rotate a phonograph record, means for mounting said reproducing arm for translated movement relative to a record on said turntable over said address fields and for movement between a first position engaging a record in said turntable for reproducing data on the record and a second position out of engagement with a record on said turntable, means coupled to said storage means for translating said arm in its second position to an address field on a record on said turntable determined by the contents of said storage means, means responsive to the translated position of said arm for moving said arm to its first position when said translated position is that directed by the contents of said storage means.

* * * * *